United States Patent
Du et al.

(10) Patent No.: US 8,189,582 B2
(45) Date of Patent: May 29, 2012

(54) MULTICAST SUPPORTED VIRTUAL LOCAL AREA NETWORK SWITCHING SYSTEM AND METHOD THEREOF

(75) Inventors: Ke Du, Shenzhen (CN); Chen Wu, Shenzhen (CN); Chengfa Fan, Shenzhen (CN); Yanfeng Qu, Shenzhen (CN)

(73) Assignee: ZTE Corporation (CN)

( * ) Notice: Subject to any disclaimer, the term of this patent is extended or adjusted under 35 U.S.C. 154(b) by 580 days.

(21) Appl. No.: 11/996,641

(22) PCT Filed: Aug. 8, 2006

(86) PCT No.: PCT/CN2006/002005
§ 371 (c)(1),
(2), (4) Date: Jan. 24, 2008

(87) PCT Pub. No.: WO2007/019785
PCT Pub. Date: Feb. 22, 2007

(65) Prior Publication Data
US 2008/0219260 A1   Sep. 11, 2008

(30) Foreign Application Priority Data

Aug. 19, 2005  (CN) .......................... 2005 1 0090925

(51) Int. Cl.
*H04L 12/28* (2006.01)
*H04L 12/56* (2006.01)
(52) U.S. Cl. ................................. 370/390; 370/395.53
(58) Field of Classification Search .................. None
See application file for complete search history.

(56) References Cited

U.S. PATENT DOCUMENTS

| 5,959,989 A | * | 9/1999 | Gleeson et al. ............... 370/390 |
| 6,331,983 B1 | * | 12/2001 | Haggerty et al. ............. 370/400 |
| 6,370,142 B1 | | 4/2002 | Pitcher et al. |

(Continued)

FOREIGN PATENT DOCUMENTS

CN   1536837 A   10/2004
(Continued)

OTHER PUBLICATIONS

European Search Report Dated Apr. 16, 2010, Applicant ZTE Corporation, Application No. 06775323.6-2416.

*Primary Examiner* — Gregory Sefcheck
*Assistant Examiner* — Suk Jin Kang
(74) *Attorney, Agent, or Firm* — Brooks Kushman P.C.

(57) ABSTRACT

A multicast-supported virtual local area network switching system and a method thereof comprise a switching engine, a CPU unit, further comprising a mapping storage unit for storing the mapping relationship of the virtual local area network and the multicast stream pushed to the switching system by it, and a switching table storage unit for storing the corresponding relation between ingress virtual local area network and egress virtual local area network; the switching engine receives the internet group management protocol message from the user virtual local area network and transmits the message to the CPU unit for processing, if it is Internet group management protocol join/leave message, the CPU unit looks up the mapping storage unit and forwards it in the looked-up multicast virtual local area network; the switching engine receives the Internet group management protocol messages or multicast data frames from the multicast virtual local area network and forwards them in the looked-up user virtual local area network by looking up the switching table storage unit.

11 Claims, 3 Drawing Sheets

U.S. PATENT DOCUMENTS

| | | | |
|---|---|---|---|
| 6,977,891 B1 * | 12/2005 | Ranjan et al. | 370/229 |
| 7,389,359 B2 * | 6/2008 | Jain et al. | 709/238 |
| 2002/0120769 A1 * | 8/2002 | Ammitzboell | 709/238 |
| 2002/0191628 A1 | 12/2002 | Liu et al. | |
| 2003/0142672 A1 * | 7/2003 | Chen et al. | 370/390 |
| 2003/0165140 A1 * | 9/2003 | Tang et al. | 370/393 |
| 2004/0125803 A1 * | 7/2004 | Sangroniz et al. | 370/390 |
| 2005/0041665 A1 * | 2/2005 | Weyman et al. | 370/390 |
| 2005/0195817 A1 * | 9/2005 | Chen et al. | 370/390 |
| 2006/0146823 A1 * | 7/2006 | Ding | 370/390 |
| 2006/0209829 A1 * | 9/2006 | Lo et al. | 370/392 |

FOREIGN PATENT DOCUMENTS

| | | |
|---|---|---|
| CN | 1543132 A | 11/2004 |
| EP | 1 318 628 A1 | 6/2003 |
| EP | 1 435 706 A2 | 7/2004 |

\* cited by examiner

MULTICAST SUPPORTED VIRTUAL LOCAL AREA NETWORK SWITCHING SYSTEM AND METHOD THEREOF

This application is the National Stage of International Application No. PCT/CN2006/002005, filed Aug. 8, 2006, which claims priority to China Application No. 200510090925.0, filed Aug. 19, 2005.

TECHNICAL FIELD

The present invention relates to virtual local area network (VLAN) switching system, more specifically, relates to multicast-supported virtual local area network switching (Multicast VLAN Switch, MV-Switch) system and a method thereof.

TECHNICAL BACKGROUND

VLAN Switch (V-Switch) technology is a two-layer switching technology that has been developed in recent years. It changes the VLAN tag from global tag to local tag and replaces the MAC-based (media access control layer) switching with VLAN tag-based switching, and thus improves the scalability of the network.

However, the one-to-one switching between VLANs of the V-Switch limits the development of the multicast application. For instance, due to the reasons of bandwidth and safety, users need to be isolated by VLAN, but the data stream in the multicast VLAN can not be switched to multi-user VLAN by V-Switch technology.

While, another kind of multicast VLAN Register (Multicast VLAN Register, MVR) technology can realize the two-layer multicast that spans VLAN, but it employs MAC switching technology within the multicast VLAN which only supports the application scenario where all the multicast streams are in one VLAN. Meanwhile, the MVR mechanism probably forwards user-refused or unsafe multicast stream, such as those of other groups having the same mapping MAC address, as well as the multicast stream of other source addresses existing in the same group when the user designates the source address access group, to the user VLAN.

Therefore, it becomes an urgent technical problem to be solved currently that how to realize a VLAN-based switching technology not limited to transmitting the multicast stream within one VLAN.

SUMMARY OF THE INVENTION

The technical problem to be solved in the present invention is to provide a multicast-supported virtual local area network switching system and a method thereof, by which, the transmission of multicast stream within one or multiple multicast VLANs can be realized, and the multicast-supported virtual LAN switching system is able to forward the multicast stream to the users within one or multiple different VLANs, while the multicast receivers do not need to receive the redundant unsafe stream of other multicast groups having the same multicast address.

In order to solve the above technical problem, the present invention provides the following solution:

a multicast-supported virtual local area network switching system, comprising a switching engine, a CPU unit, further comprising:

a mapping storage unit for storing the pre-established mapping table of source group pairs and multicast VLANs, said mapping table being used for recording the mapping relationship between virtual local area network numbers and the multicast streams pushed from the virtual local area network to the virtual local area network switching system;

a switching table storage unit for storing virtual local area network switching table which records the corresponding switching relation between ingress virtual local area network and egress virtual local area network;

wherein, said switching engine receives the IGMP (Internet Group Management Protocol) message from the user VLAN, then passes the message to said CPU unit for processing; if said IGMP message is IGMP join/leave message, said CPU unit looks up the mapping table of the source group pairs and the multicast VLANs in said mapping storage unit according to the source group pairs of the IGMP join/leave message, and forwards said IGMP join/leave message in the looked-up multicast VLAN;

Said switching engine receives the IGMP message from multicast VLAN and forwards it to said CPU unit for processing, if said IGMP message is IGMP query message, then said CPU unit forwards said IGMP query message in the looked-up user VLAN by looking up the virtual local area network switching table in the switching table storage unit.

A method for realizing multicast-supported virtual local area network switching, which is used in the virtual local area network switching system comprising the switching engine and CPU unit, including the following steps of:

pre-establishing the mapping table of the source group pairs and the multicast VLANs constituted by virtual local area network numbers and multicast streams forwarded by virtual local area network according to the multicast streams forwarded from the virtual local area network to the virtual local area network switching system in the network;

said switching engine receiving the IGMP message from the user VLAN, then it passing the message to said CPU unit for processing, if said IGMP message being IGMP join/leave message, said CPU unit looking up the mapping table of the source group pairs and the multicast VLANs according to the source group pairs in said IGMP join/leave message, and forwarding said IGMP join/leave message in the looked-up multicast VLAN, meanwhile, establishing the virtual local area network switching table;

said switching engine receiving the IGMP message from the multicast VLAN and forwarding it to said CPU unit for processing, if said IGMP message is IGMP query message, said CPU unit forwarding said IGMP query message in the looked-up user VLAN by looking up the virtual local area network switching table.

The switching engine receives the multicast data frames from the multicast virtual local area network, and forwards them in the looked-up user virtual local area network by looking up in the switching table storage unit.

Compared with the prior art, the present invention has the following advantages:

The method described in this invention realizes the networking application where the multicast stream is switched from VLAN switch mechanism to multi-user VLAN, and flexible networking application of one or multiple multicast VLANs; it can completely avoid the situation that users receive unwanted multicast stream under the condition that each multicast stream has one multicast VLAN; and it supports the join of the users' specific source group (S, G), when the users on the interface join into the multicast by way of (S, G) join, they will not receive other multicast streams of the same group.

The technical problem to be solved, the essence of the technical scheme and the beneficial effects of this invention will be further explained through the embodiments and accompanying drawings.

PREFERRED EMBODIMENTS OF THIS INVENTION

Figure 1:
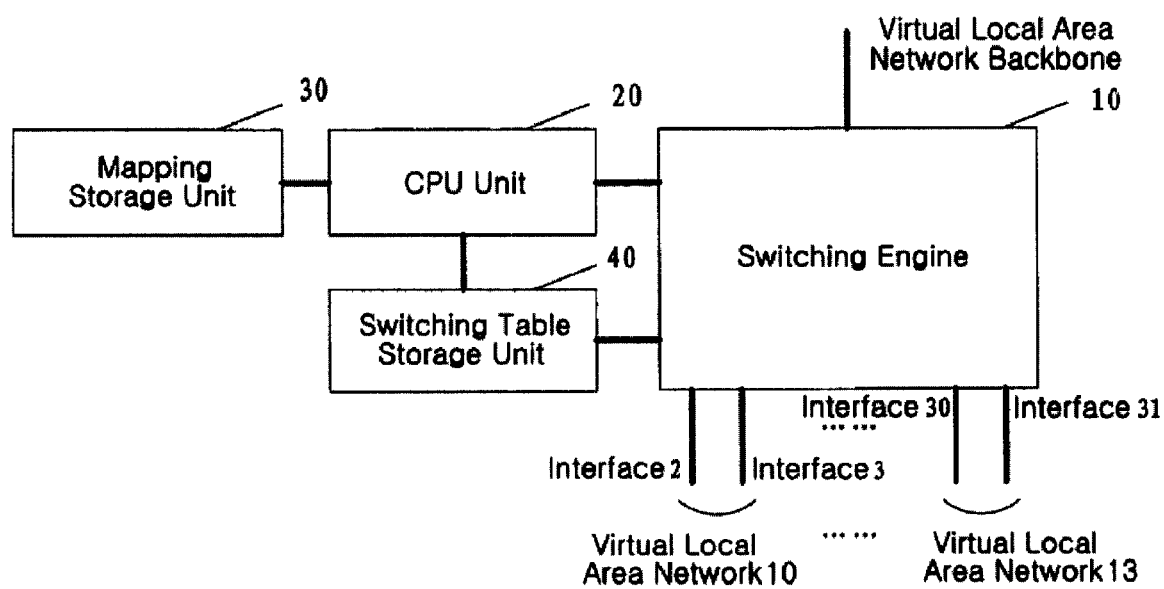
FIG. 1 is the schematic view of the multicast-supported virtual local area network switching system as described in this invention.

As shown in FIG. 1, it is the schematic view of the multicast-supported virtual local area network switching system described in this invention. A multicast-supported virtual local area network switching system first comprises a switching engine 10, a CPU unit 20, and further comprises a mapping storage unit 30 for storing the mapping table of the source group pairs and the multicast virtual local area networks which records the mapping relationship between virtual local area network numbers and the multicast streams pushed from the virtual local area network to the virtual local area network switching system, and a switching table storage unit 40 for storing a virtual local area network switching table which records the corresponding switching relation between an ingress virtual local area network and an egress virtual local area network; wherein, when said switching engine receives an IGMP message from a user VLAN, it passes the message to said CPU unit for processing, if said IGMP message is an query message, the CPU unit discards said IGMP message; if said IGMP message is an IGMP join/leave message, said CPU unit looks up the mapping table of the source group pairs and the multicast VLANs in said mapping storage unit 30 according to said source group pairs of said IGMP join/leave message, and forwards said IGMP join/leave message in the looked-up multicast VLAN; further, if the IGMP message is the IGMP join/leave message and the system launches the IGMP Snooping and IGMP Proxy schemes, the CPU unit transmits the IGMP join/leave message in the looked-up multicast VLAN according to the IGMP Snooping and IGMP Proxy schemes.

When said switching engine receives the IGMP message from the multicast VLAN, it passes the message to said CPU unit for processing, if said IGMP message is the IGMP query message, the CPU unit forwards said IGMP query message in the looked-up user VLAN by looking up the virtual local area network switching table of the switching table storage unit 40. However, if the system also launches the IGMP Snooping and IGMP Proxy schemes, the CPU unit forwards the query message in said looked-up user VLAN according to the IGMP Snooping and IGMP Proxy schemes.

Here, said virtual local area network switching table can be obtained through static configuration of the CPU unit, or through static configuration of network management device, or through an auto-study mechanism.

Wherein, said auto-study mechanism of the virtual local area network switching table is: during the processing of receiving the IGMP message from the user VLAN, if the message is a join message, it is to add the user VLAN to an egress virtual local area network list in the switching table that uses the multicast VLAN as the ingress VLAN; if the message is a leave message, it is delayed to delete the user VLAN from the egress virtual local area network list in the switching table that uses the multicast VLAN as the ingress VLAN, or it is to delete the user VLAN from the egress virtual local area network list in the switching table that uses the multicast VLAN as the ingress VLAN after the IGMP Snooping and IGMP Proxy schemes have confirmed that members of the multicast group have left.

Within said virtual local area network switching table, the egress virtual local area network field can record one or multiple egress virtual local area networks, if the egress virtual local area network filed records multiple egress VLANs, the copies of data frames received from the ingress virtual local area network need to be sent on each egress virtual local area network.

When there is more than one interface in the user VLAN, said virtual local area network switching table can not only record the egress virtual local area network, but also the interface of the egress virtual local area network; the switching engine completes the switching process from the ingress virtual local area network to the user VLAN designated egress interface at a time and forwards on the interface that is designated by the virtual local area network switching table.

In the following, the method for realizing the system of this invention will be further explained in combination with accompanying FIGS. 2 and 3.

First, the mapping table of the source group pairs and the multicast VLANs constituted by the virtual local area network numbers and multicast streams forwarded by the virtual local area network are set up according to the multicast stream that is pushed from the virtual local area network to the virtual local area network switching system in the network; when said switching engine receives the IGMP message from the user VLAN, it passes the message to said CPU unit for processing, if said IGMP message is an IGMP join/leave message, said CPU unit looks up the mapping table of said source group pairs and the multicast VLANs based on the source group pairs in said IGMP join/leave message, and forwards said IGMP join/leave message in the looked-up multicast VLAN, and at the meantime, establishes a virtual local area network switching table, wherein, if the message is a join message, the user VLAN is added to the egress virtual local area network list in the switching table that uses the multicast VLAN as the ingress VLAN; if the message is a leave message, it is delayed to delete the user VLAN from the egress virtual local area network list in the switching table that uses the multicast VLAN as the ingress VLAN, or it is to delete the user VLAN from the egress virtual local area network list in the switching table that uses the multicast VLAN as the ingress VLAN after the IGMP Snooping and IGMP Proxy schemes have confirmed that members of the multicast group have left. When said switching engine receives IGMP message from the multicast VLAN, it passes the message to said CPU unit for processing, if the IGMP message is an IGMP query message, the CPU unit forwards said IGMP query message in the user VLAN which is obtained by looking up the virtual local area network switching table.

Figure 2:
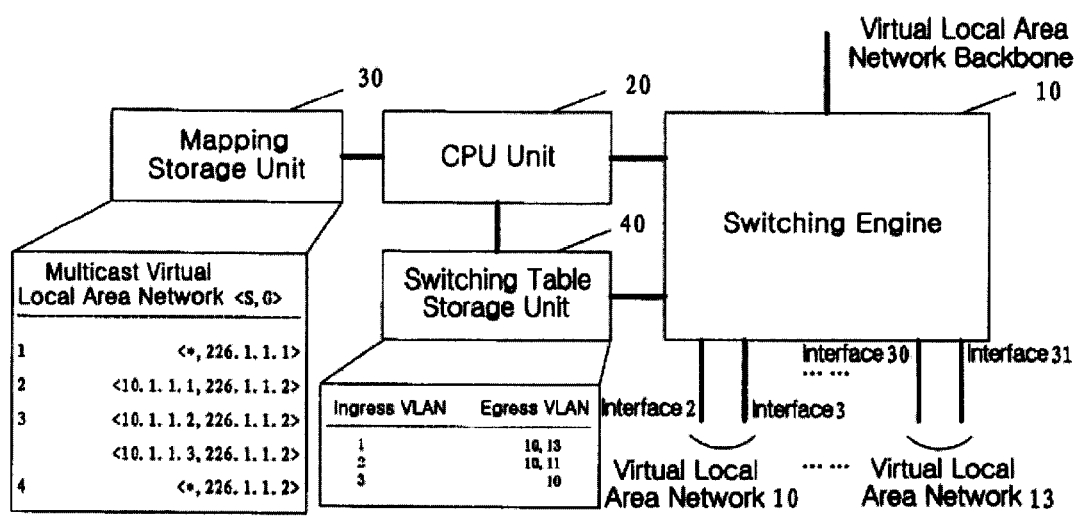
FIG. 2 is the schematic view of an embodiment of the method of this invention.
Figure 3:
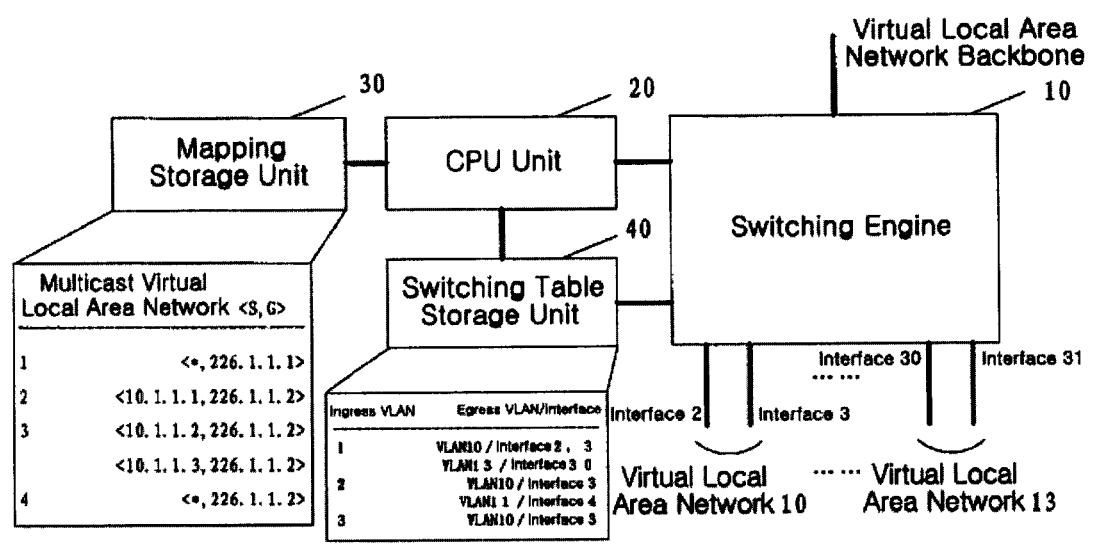
FIG. 3 is the schematic view of another embodiment of the method of this invention.

In the mapping table of the source group pairs and the multicast VLANs as shown in FIGS. 2 and 3, assuming that VLAN 1 in the network transmits the multicast streams of <*, 226.1.1.1> to the system, VLAN 2 transmits the multicast streams of <10.1.1.1, 226.1.1.2>, VLAN3 transmits the multicast streams of <10.1.1.2, 226.1.1.2> and <10.1.1.3, 226.1.1.2>, and VLAN 4 transmits the multicast streams of <*, 226.1.1.3>.

On interface 2 of VLAN 10, the user sends out IGMP join message of Group=226.1.1.1, the switching engine passes the message to the CPU unit for processing, the CPU unit looks up the mapping table of the source group pairs and the multicast VLANs to know that the corresponding multicast VLAN is VLAN 1, then the CPU unit sends out IGMP join message of Group=226.1.1.1 on VLAN 1 through the switching engine to relay multicast stream, and at the same time, the CPU unit sets up ingress VLAN field to be the entry of VLAN 1 in the virtual local area network switching table and adds VLAN 10 or VLAN 10/PORT 2 to egress VLAN filed, as it is shown in FIG. 3.

Interface 30 in VLAN 13 also transmits IGMP join message of Group=226.1.1.1, the switching engine passes the message to the CPU unit for processing as well, the CPU unit looks up the mapping table of the source group pairs and the multicast VLANs and know that the corresponding multicast VLAN is VLAN 1, then the CPU sends out IGMP join message of Group=226.1.1.1 through the switching engine to relay multicast stream, and at the same time, the CPU unit adds VLAN 13 or VLAN 13/PORT 30 to the egress VLAN field with the ingress VLAN field to be the entry of VLAN 1 in the virtual local area network switching table, as it is shown in FIG. 3.

If at the time, a certain source group is transmitting the streams of 226.1.1.1 and also forwarding them to VLAN 1, the switching engine can know to multicast the streams of VLAN 1 to VLAN 10 and VLAN 13 by looking up the virtual local area network switching table, and to or not to punch the user VLAN tag for forwarding on all the interfaces of VLAN 10 and VLAN 13 according to the configuration, as it is shown in FIG. 2. Here, the switching engine can also know to multicast the streams of VLAN 1 to PORT 2 of VLAN 10 and PORT 30 of VLAN 13, and to or not to punch the user VLAN tag for forwarding according to the configurations of PORT 2 of VLAN 10 and PORT 30 of VLAN 13, as it is shown in FIG. 3.

In the existing technology, if a certain interface on the equipment is relaying the multicast streams of group=227.1.1.1 at the same time, then in the existing MAC-based switching system, since the multicast streams of group=227.1.1.1 and multicast streams of group=226.1.1.1 have the same destination MAC address, the PORT 2 of VLAN 10 and PORT 30 of VLAN 13 will also receive the multicast streams of group=227.1.1.1. However, in the system of this invention, because the PORT 2 of VLAN 10 and PORT 30 of VLAN 13 only transmit IGMP join message of Group=226.1.1.1, the system only transfers the streams of the corresponding VLAN 1 to these interfaces, so as to avoid the receiving of superfluous unsafe multicast streams of different groups with the same MAC address.

If the user sends out IGMP join message of Group=226.1.1.2 on interface 3 of VLAN 10, the switching engine passes the message to the CPU unit for processing, the CPU unit looks up the mapping table of the source group pairs and the multicast VLANs and knows that the corresponding multicast VLANs are VLAN 2 and VLAN 3, wherein VLAN 2 has multicast stream <10.1.1.1, 226.1.1.2>, and VLAN 3 has multicast streams <10.1.1.2, 226.1.1.2> and <10.1.1.3, 226.1.1.2>, then the CPU sends out an IGMP join message of Group=226.1.1.2 in both VLAN 2 and VLAN 3 simultaneously through the switching engine to relay the multicast streams, meanwhile, the CPU sets up entries with the ingress VLAN field being VLAN 2 and VLAN 3 in the virtual local area network switching table and adds VLAN 10 or VLAN 10/PORT 3 to the egress VLAN field. The multicast stream<10.1.1.1, 226.1.1.2> in VLAN2, the multicast streams <10.1.1.2, 226.1.1.2> and <10.1.1.3, 226.1.1.2> in VLAN 3 can all arrive at interface 3, as it is shown in FIG. 3.

If the user sends out IGMPv3 join message of Source=10.1.1.1, Group=226.1.1.2 on interface 4 of VLAN 11, the switching engine passes the message to the CPU unit for processing, the CPU unit looks up the mapping table of the source group pairs and the multicast VLANs and knows that the corresponding multicast VLAN is VLAN 2 (unmatched with VLAN 3), then the CPU sends out the IGMPv3 join message of Source=10.1.1.1, Group=226.1.1.2 in the VLAN 2 through the switching engine to relay the multicast streaming, meanwhile, the CPU sets up entries with the ingress VLAN field being VLAN 2 in the virtual local area network switching table and adds VLAN 11 or VLAN 11/PORT 4 to the egress VLAN field. The multicast stream <10.1.1.1, 226.1.1.2> in VLAN 2 can arrive at interface 4, while the multicast streams <10.1.1.2, 226.1.1.2> and <10.1.1.3, 226.1.1.2> in VLAN 3 can not arrive at interface 4, as it is shown in FIG. 3.

The multicast-supported virtual local area network switching system and the method thereof stated in this invention are not limited to the applications described in the specification and embodiments, instead, they are absolutely applicable to any field suitable for this invention. People skilled in the art can easily realize other advantages and make modifications. Therefore, this invention is not limited to the specific details, representative equipments as well as the examples and figures described herein without departing from the essence and scope of the general concept defined by the appended claims as well as their equivalent scope.

What we claim is:

1. A multicast-supported virtual local area network switching system, comprising a switching engine, a CPU unit, characterized in further including:

a mapping storage unit, for storing a pre-established mapping table of source group pairs and multicast virtual local area networks which records a mapping relationship between numbers of virtual local area networks and multicast streams forwarded from the virtual local area networks to the virtual local area network switching system; and a switching table storage unit, for storing a virtual local area network switching table which records a corresponding switching relationship between an ingress virtual local area network and an egress virtual local area network;

wherein, when said switching engine receives an Internet group management protocol message from a user virtual local area network, the switching engine passes the message to said CPU unit for processing, if said Internet group management protocol message is an Internet group management protocol join/leave message, said CPU unit looks up the mapping table of the source group pairs and the multicast virtual local area networks in said mapping storage unit according to the source group pair of said Internet group management protocol join/leave message, and forwards said Internet group management protocol join/leave message in a looked-up multicast virtual local area network; and when said switching engine receives an Internet group management protocol message from a multicast virtual local area network, the switching engine forwards the message to said CPU unit for processing, if said Internet group management protocol message is an Internet group management protocol query message, the CPU unit forwards the Internet group management protocol query message in a user virtual local area network which is obtained by looking up the virtual local area network switching table within the switching table storage unit;

wherein the virtual local area network switching table in said switching table storage unit is obtained through an auto-study mechanism, and the auto-study mechanism is: during a process of receiving the Internet group management protocol message from the user virtual local area network, if the message is a join message, the user virtual local area network is added into an egress virtual local area network list in the switching table which uses the multicast virtual local area network as an ingress virtual local area network; if the message is a leave message, it is delayed to delete the user virtual local area network from the egress virtual local area network list of the switching table which uses the multicast virtual local area network as the ingress virtual local area network, or it is to delete the user virtual local area network from the egress virtual local area network list of the switching table which uses the multicast virtual local area network as the ingress virtual local area network after Internet group management protocol Snooping and Internet group management protocol Proxy schemes confirm that multicast group members have left.

2. The multicast-supported virtual local area network switching system of claim 1, wherein within the virtual local area network switching table of the switching table storage unit, an egress virtual local area network field can record one or multiple egress virtual local area networks, if the egress virtual local area network field records multiple egress virtual local area networks, copies of data frames received from the ingress virtual local area network need to be sent in each of the egress virtual local area networks.

3. The multicast-supported virtual local area network switching system of claim 2, wherein when there is more than one interface in the user virtual local area network, the virtual local area network switching table of said switching table storage unit not only records the egress virtual local area network, but also records an interface of the egress virtual local area network on which an Internet group management protocol join message has been sent; the switching engine completes a switching process from the ingress virtual local area network to the designated egress interface of the user virtual local area network at a time and forwards on the interface designated by the virtual local area network switching table.

4. The multicast-supported virtual local area network switching system of claim 1, wherein when there is more than one interface in the user virtual local area network, the virtual local area network switching table of said switching table storage unit not only records the egress virtual local area network, but also records an interface of the egress virtual local area network on which an Internet group management protocol join message has been sent; the switching engine completes a switching process from the ingress virtual local area network to the designated egress interface of the user virtual local area network at a time and forwards on the interface designated by the virtual local area network switching table.

5. The multicast-supported virtual local area network switching system of claim 1, wherein during the process of receiving the Internet group management protocol message from the user virtual local area network, if said Internet group management protocol message is the query message, the Internet group management protocol message will be discarded.

6. The multicast-supported virtual local area network switching system of claim 1, wherein during the process of receiving the Internet group management protocol message from the user virtual local area network, if the Internet group management protocol message is the Internet group management protocol join/leave message and the system launches Internet group management protocol Snooping and Internet group management protocol Proxy schemes, the CPU unit transmits the Internet group management protocol join/leave message in the multicast virtual local area network looked up from said mapping table of the source group pairs and the multicast virtual local area networks according to the Internet group management protocol Snooping and the Internet group management protocol Proxy schemes.

7. The multicast-supported virtual local area network switching system of claim 1, wherein during the process of receiving the Internet group management protocol message from the multicast virtual local area network, if the system launches Internet group management protocol Snooping and Internet group management protocol Proxy schemes at the same time, the CPU unit will process according to the Internet group management protocol Snooping and the Internet group management protocol Proxy schemes, and transmit the query message in the user virtual local area network.

8. A method for realizing multicast-supported virtual local area network switching, used in a virtual local area network switching system including a switching engine and a CPU unit, comprising following steps of:

pre-establishing a mapping table of source group pairs and multicast virtual local area networks constituted by numbers of virtual local area networks and multicast streams forwarded by the virtual local area networks according to the multicast streams forwarded from the virtual local area networks to the virtual local area network switching system in a network;

when said switching engine receives an Internet group management protocol message from a user virtual local area network, the switching engine passing the message to said CPU unit for processing, if said Internet group management protocol message is an Internet group management protocol join/leave message, said CPU unit looking up the mapping table of said source group pairs and said multicast virtual local area networks according to the source group pair in said Internet group management protocol join/leave message, and forwarding said Internet group management protocol join/leave message in a looked-up multicast virtual local area network, meanwhile, the CPU unit establishing a virtual local area network switching table;

when said switching engine receives an Internet group management protocol message from a multicast virtual local area network, the switching engine forwarding the message to said CPU unit for processing, if said Internet group management protocol message is an Internet group management protocol query message, the CPU unit forwarding said Internet group management protocol query message in a user virtual local area network obtained by looking up the virtual local area network switching table; and said switching engine receiving multicast data frames from a multicast virtual local area network and forwarding them in a looked-up user virtual local area network by looking up a switching table storage unit;

wherein said establishing of the virtual local area network switching table is: if it is a join message, the user virtual local area network is added into an egress virtual local area network list of the switching table that uses the multicast virtual local area network as an ingress virtual local area network; if it is a leave message, it is delayed to delete the user virtual local area network from the egress virtual local area network list of the switching table that uses the multicast virtual local area network as the ingress virtual local area network, or it is to delete the user virtual local area network from the egress virtual local area network list of the switching table that uses the multicast virtual local area network as the ingress virtual local area network after Internet group management protocol Snooping and Internet group management protocol Proxy schemes have confirmed that multicast group members have left.

9. The multicast-supported virtual local area network switching system of claim 8, wherein within the virtual local area network switching table, an egress virtual local area network field can record one or multiple egress virtual local area networks, if the egress virtual local area network filed records multiple egress virtual local area networks, copies of data frames received from the ingress virtual local area network need to be sent in each egress virtual local area network.

10. The multicast-supported virtual local area network switching system of claim 9, wherein when there is more than one interface in the user virtual local area network, said virtual local area network switching table not only records the egress virtual local area network, but also records an interface of the egress virtual local area network on which an Internet group management protocol join message has been sent; the switching engine completes switching process from the ingress virtual local area network to the designated egress interface of the user virtual local area network at a time and forwards on the interface designated by the virtual local area network switching table.

11. The multicast-supported virtual local area network switching system of claim 8, wherein when there is more than one interface in the user virtual local area network, said virtual local area network switching table not only records the egress virtual local area network, but also records an interface of the egress virtual local area network on which an Internet group management protocol join message has been sent; the switching engine completes switching process from the ingress virtual local area network to the designated egress interface of the user virtual local area network at a time and forwards on the interface designated by the virtual local area network switching table.

* * * * *